March 27, 1962 A. P. LUNT ET AL 3,026,924
APPARATUS FOR SHEATHING A CABLE OR THE LIKE
Filed Nov. 26, 1957 3 Sheets-Sheet 1
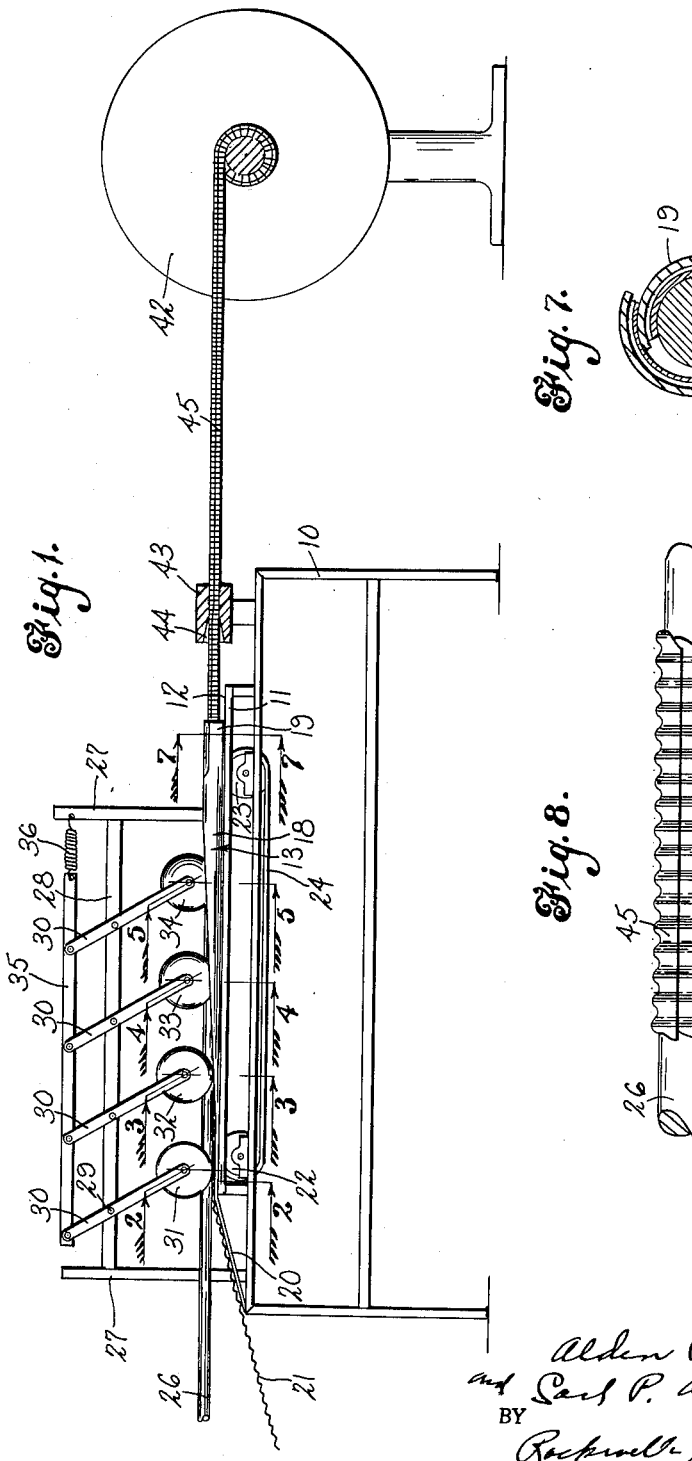
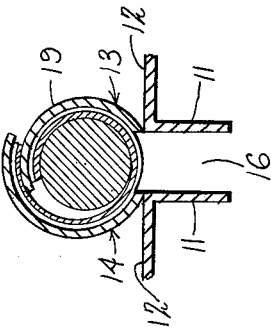
INVENTORS
Alden P. Lunt
Carl P. Anderson
BY
Rockwell Berthold
ATTORNEYS March 27, 1962 A. P. LUNT ET AL 3,026,924
APPARATUS FOR SHEATHING A CABLE OR THE LIKE
Filed Nov. 26, 1957 3 Sheets-Sheet 2
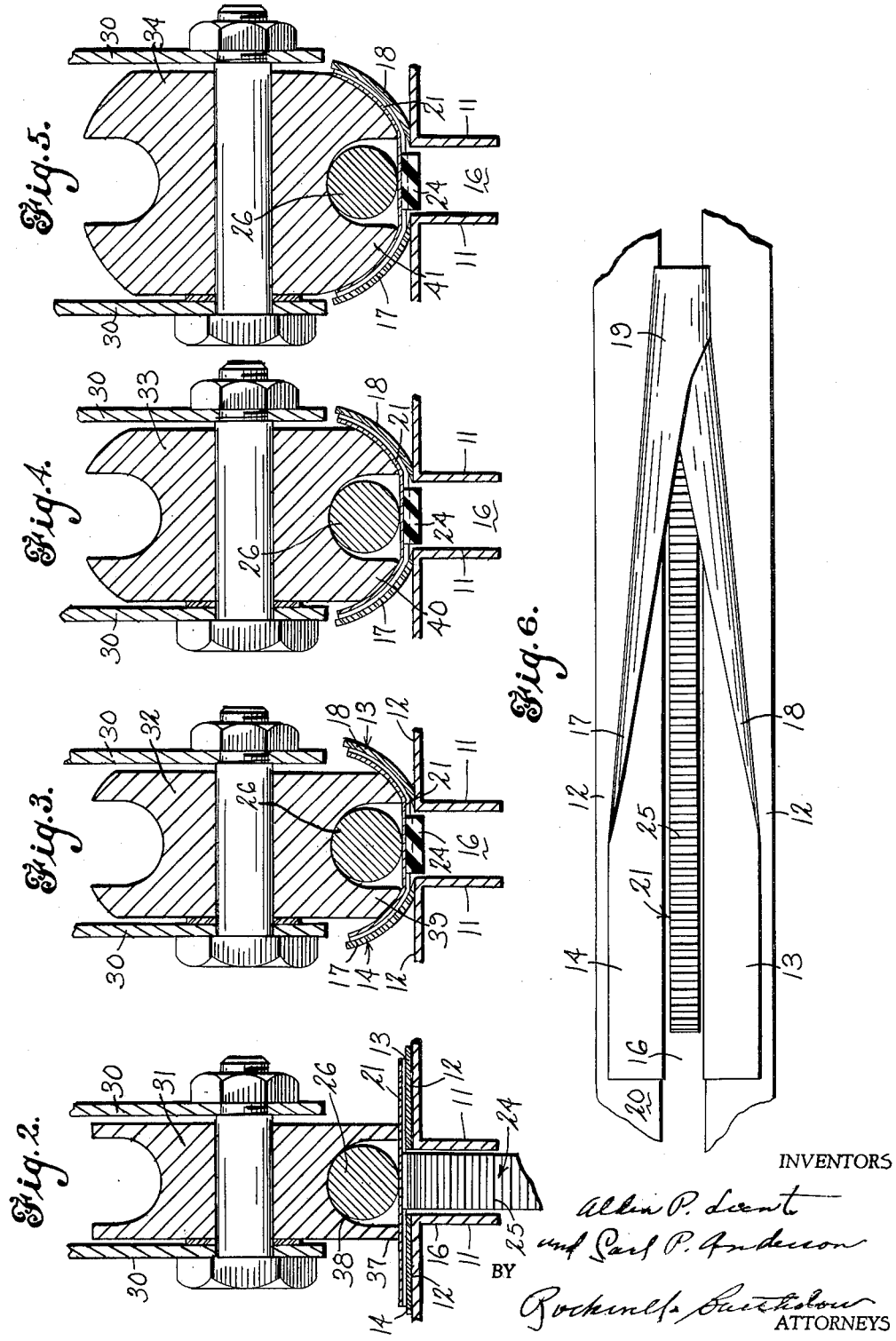

March 27, 1962 A. P. LUNT ET AL 3,026,924
APPARATUS FOR SHEATHING A CABLE OR THE LIKE
Filed Nov. 26, 1957 3 Sheets-Sheet 3
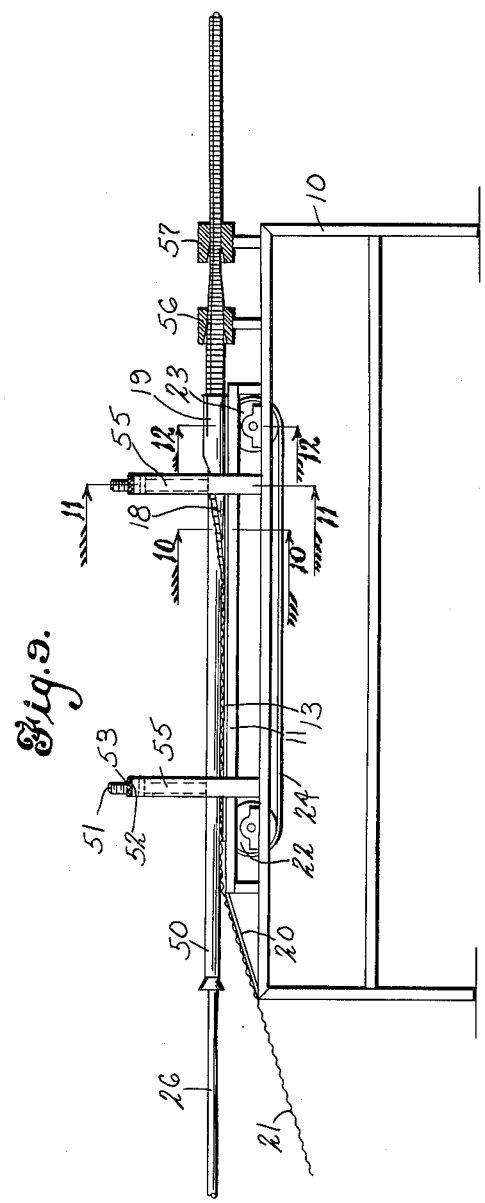
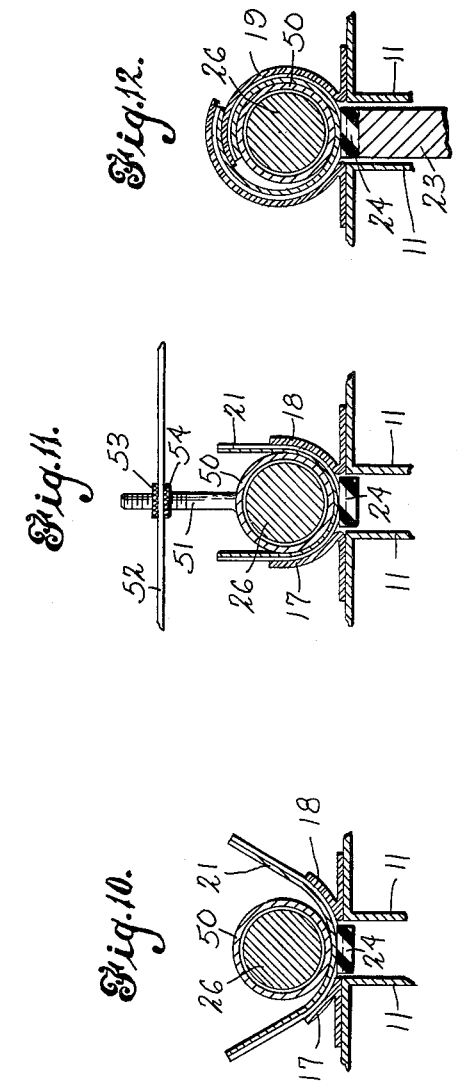
INVENTORS
Alden P. Lunt
and Carl P. Anderson
BY Rockwell & Bartholow
ATTORNEYS

United States Patent Office 3,026,924
Patented Mar. 27, 1962

3,026,924
APPARATUS FOR SHEATHING A CABLE OR THE LIKE
Alden P. Lunt, Barrington, and Carl P. Anderson, Pawtucket, R.I., assignors to The Ansonia Wire & Cable Company, Ashton, R.I., a corporation of Connecticut
Filed Nov. 26, 1957, Ser. No. 699,062
9 Claims. (Cl. 153—1)

This invention relates to an apparatus for sheathing a cable, and more particularly to an apparatus for forming a metal strip, particularly a corrugated strip, into tubular form so that it may serve as a sheath for the core of an electrical cable.

In the manufacture of electrical cables, particularly a cable having a core comprising a plurality of insulated wires, it is sometimes desirable to cover the cable with a tubular metal sheath. In some instances this sheath is corrugated transversely of its length to provide corrugations extending circumferentially of the core. It is expedient to form the tubular sheaths from a flat strip of material of a proper width to embrace the particular size cable which is being covered and to form this flat strip into a tube as the strip and core are passed through a forming device.

In accordance with the present invention a forming guide is provided through which the core and strip are passed, this guide being substantially flat at the entering end of the core and strip and having its walls gradually curved upwardly and inwardly to form a substantially complete tube at its other end. As the strip which is to form the sheath of the cable and the core are passed through this guide the strip is gradually bent into tubular form. As illustrated, this forming guide is provided with a longitudinal opening at the bottom which is engaged by the strip and an endless conveyor, such as a notched metal chain or serrated belt, travels within the guide along this opening and in engagement with the strip so as to propel or drive the latter through the guide. This belt is serrated or provided with transverse ribs which will engage the strip and particularly, if the strip is corrugated, will engage in the corrugations therein so as to grip or mesh with the corrugations of the strip to provide a positive driving connection between these two elements.

As shown, the forming guide tube is made of two separate parts or halves, the adjacent edges of which are spaced apart to provide an opening therebetween through which the serrated belt may move. It will be understood, however, that the guide may be made in one piece and a longitudinal opening formed therein to receive the belt if desired. The core, which may be the cable itself, is carried through the guide at the upper side of the strip, that is, in the side opposite the serrated belt, and rollers are provided on the side of the core opposite the tape strip to urge the core into contact with the strip and urge the latter into contact with the belt. Preferably these rollers are resiliently urged toward the core as will be hereinafter explained.

If a strip is to be formed in a tube without being formed around a cable core, or if the cable core is relatively soft so that it will not serve as a satisfactory mandrel, a tubular mandrel may be employed about which the strip is formed. If it is to be formed about a soft cable core, the latter will be passed through the tubular mandrel and the sheath formed upon the mandrel and thereafter closed upon the cable after the latter leaves the mandrel.

One object of the present invention is to provide a new and efficient apparatus for forming a tubular sheath from a flat strip of material.

Still another object of the invention is to provide an apparatus for sheathing a cable or like core wherein the core and a metal strip are advanced longitudinally through a forming guide tube designed to bend the metal strip into a tubular sheath, and means are provided to engage the strip and advance it through the guide tube along with the cable.

Still another object of the invention is to provide an apparatus for forming a sheath upon a cable or like core wherein means are provided to engage the core on the side thereof opposite the strip and hold the latter in engagement with a traveling belt to advance the strip through the forming guide.

Still another object of the invention is to provide an apparatus of the character described for forming a tubular sheath from a flat strip wherein the traveling belt which engages the strip to convey it through the apparatus is provided with transverse ribs or serrations to grip the strip and positively advance it.

To these and other ends the invention consists in the novel features and combinations of parts to be hereinafter described and claimed.

In the accompanying drawings:
FIG. 1 is a side elevational view of an apparatus embodying the invention for forming a metal strip into a sheathing tube;
FIG. 2 is a sectional view on line 2—2 of FIG. 1;
FIG. 3 is a sectional view on line 3—3 of FIG. 1;
FIG. 4 is a sectional view on line 4—4 of FIG. 1;
FIG. 5 is a sectional view on line 5—5 of FIG. 1;
FIG. 6 is a plan view of the forming guide tube and the propelling belt;
FIG. 7 is a sectional view on line 7—7 of FIG. 1;
FIG. 8 is a fragmentary view of a covered cable core having a corrugated sheath thereon;
FIG. 9 is a view similar to FIG. 1, showing a modified form of the invention;
FIG. 10 is a sectional view on line 10—10 of FIG. 9;
FIG. 11 is a sectional view on line 11—11 of FIG. 9; and
FIG. 12 is a sectional view on line 12—12 of FIG. 9.

To illustrate a preferred embodiment of the invention there is shown in FIG. 1 of the drawings an apparatus for providing a covering sheath upon a cable core comprising a frame 10. Upon the frame are provided spaced supporting members 11 of L-shaped form in cross section, these members presenting spaced flat supporting surfaces 12 and extend longitudinally of the frame in the direction of travel of the work, as will be hereinafter explained. Upon the members 12 is secured a forming guide tube to receive and form a flat or tape-like strip of material into a tube. As illustrated, this forming guide tube is composed of two substantially similar parts 13 and 14, the adjacent edges of which are spaced apart to form an opening 16 therebetween (FIG. 6). At their remote edges the walls of the two parts 13 and 14 of the guide are gradually turned upwardly and inwardly, as shown at 17 and 18, so that at the remote or delivery end of the guide member the walls are closed substantially to form a tube, as shown at 19. It will be understood that the opening 16 extends through this guide member so that in effect a split tube is formed. However, if desired, this forming guide tube may be formed of a single piece of material and the opening 16 formed therein for substantially its entire length and for a purpose to be hereinafter described. The flat ends of the forming guide member at the front of the apparatus may extend forwardly of the support members 12, as shown at 20 and be secured at their ends to a part of the frame.

The tape strip of which the sheath tube is formed is shown at 21 and is passed through the apparatus above and within the forming guide. The strip lies adjacent the opening 16 and its lower surface is exposed through this opening. As shown in FIG. 1, a pair of pulleys 22 and 23 are rotatably mounted in spaced relation on the frame and an endless belt 24 is trained over these pulleys. The pulleys extend upwardly a sufficient distance between the supports 11 so that the upper run of the belt 24 travels within the opening 16 and engages the lower surface of the strip 21 which is exposed through this opening. As shown more particularly in FIGS. 2 and 6, this belt is serrated or provided with transverse ribs 25 to drivingly engage the lower surface of the strip. If the strip is a corrugated one, as shown, these ribs will preferably mesh with the corrugations of the strip so as to provide a positive driving connection between these two elements.

The cable core is illustrated at 26 and, as shown, is positioned above the strip 21 so that the latter will be wrapped around this core in tubular form by the forming guide previously described. Above the frame 10 are a pair of standards 27 to which is secured a member 28 extending longitudinally of the frame. To this member are pivoted at 29 a plurality of arms 30 carrying pressure rollers 31, 32, 33 and 34. The upper ends of the arms 30 are pivoted to a link 35 urged toward the right in FIG. 1 by a tension spring 36 secured at one end to the member 35 and at its other end to the standard 27. These rollers are in engagement with the cable core 26 and, as the arms 30 are urged in a clockwise direction about their pivots 29, the rollers urge the cable 26 downwardly upon the strip 21 and urge the latter into contact with the belt 24.

Each of the rollers 31, 32, 33 and 34 is grooved to receive the cable case and, as shown more particularly in FIGS. 2 to 5 inclusive, is provided with flanges defining the groove. The flanges 37 of the roller 31, as shown in FIG. 2, lie opposite the flat portions 13 and 14 of the forming guide and, therefore, opposite the flat portion of the strip 21 before the edges have been curved upwardly out of the plane of the strip. It will be understood that the groove 38 in the roller is of the proper size to bear upon the cable core 26.

As shown in FIG. 3, the lower edges of the flanges 39 of the roller 32 are curved upwardly and, as shown in this figure, the side edges of the strip 21 are bent upwardly about the lower edges of the flanges by the parts 17 and 18 of the forming guide. Similarly the lower portions of the flanges 40 of the roller 33 and of the flanges 41 of the roller 34 are also progressively curved upwardly and outwardly as are also the portions 17 and 18 of the forming guide so that the side edges of the tape strip 21 are progressively turned toward each other and toward a tubular shape. The roller 34, the last of the series, is positioned at a forward portion of the forming guide but before the walls thereof are closed into a tubular member.

A take-up reel 42 (FIG. 1) is provided at one side of the frame upon which the covered cable is wound. This reel will be suitably driven so as to draw the cable through the forming device and will, of course, also apply tension to the tubular sheath although the principal driving means for the latter is the belt 24. The speed of the reel will preferably be synchronized with that of the belt 24 so that the cable and strip will tend to travel at the same speed.

After the sheath leaves the roller 34 it will be formed into closed tubular shape by the portion 19 of the forming guide, as shown in FIG. 7. If the meeting edges of the sheath are to be overlapped, as shown in this figure, sufficient space may be left between the overlapped edges of the forming guide at the point 19 to permit this result. After the cable core and the sheath leave the delivery end 19 of the forming guide, they are passed through a closing die 43 mounted on the frame 10, this die having a tapered opening 44 to receive the cable and sheath. In this die the sheath is closed upon the cable and the overlapping edges may, if desired, be welded prior to the reeling up of the cable upon the take-up reel 42.

In FIG. 8 of the drawings there is shown a fragmentary view of the cable 26 having a completed sheath 45 thereon, this sheath being shown as provided with circular corrugations extending transversely of the length of the strip from which the sheath was formed. As shown, the edges of the sheath are overlapped but they may, if desired, but butted and welded together. This requires only the proper shaping of the delivery end 19 of the forming guide and of the closing die.

It sometimes occurs that the cables are so soft that they will not withstand the pressure required when the tubular sheath is formed directly thereon. In this case a tubular mandrel may be employed and the sheath formed upon this mandrel. Such a structure is shown in FIG. 9 of the drawing wherein, except for the structures described below, the apparatus is substantially like that previously described. In this form of the invention the split forming guide is provided as before as is also the belt 24 to engage the corrugated strip 21 and propel it through the machine. Upon and within the forming guide 19 is a tubular mandrel 50 within which is received the cable core 26 so that this mandrel lies between the cable core and the strip 21 from which the sheath is to be formed and the latter will be formed about the mandrel.

The mandrel 50 is secured to rods 51 (FIG. 11), these rods being threaded at their upper ends and passed through openings in a horizontal frame member 52, nuts 53 and 54 being threaded upon the rod 51, one upon each side of the member 52 to adjustable secure the mandrel 50 in position so that the height at which it is supported may be regulated. The member 52 is supported upon standards 55 rising from the frame 10. As the mandrel 50 will be held downwardly upon the strip 21 by the rods 51, the pressure rollers 31 to 34 illustrated in the previous modification are not required.

As the strip 21 and cable 26 are carried through the apparatus, the sheath will be formed about the mandrel 50. The delivery end of this mandrel extends approximately to the outer end 19 of the forming guide and, when the sheath and cable leave the latter, the sheath will be wrapped or bent about the cable. It is then passed through a preliminary closing die 56 and a final closing die 57 to be closed snugly upon the cable. The cable with its enclosing sheath will then be reeled up upon a take-up reel as previously described.

While we have shown and described some embodiments of our invention, it will be understood that it is not to be limited to all of the details shown, but is capable of modification and variation within the spirit of the invention and within the scope of the claims.

What we claim is:

1. Apparatus for forming a transversely corrugated metal strip into a tube about a core member, said apparatus comprising a frame, a forming guide supported on said frame, said guide being flattened toward one end and having walls gradually curving inwardly to be rounded at the other end, said guide having a longitudinal opening extending between the walls thereof, a plurality of guide rollers supported in tandem relation adjacent the guide to engage the core member and direct it along the guide and hold it against the strip, a belt movably mounted in said longitudinal opening having transverse ribs on its upper surface to engage in the corrugations of the strip, and means for actuating said belt to draw the strip of material through said forming guide.

2. Apparatus for forming a transversely corrugated metal strip into a tube about a core member, said apparatus comprising a frame, a forming guide supported on said frame said guide being flattened toward one end and having walls gradually curving inwardly to be rounded at the other end, said guide having a longitudinal opening extending between the walls thereof, a plurality of guide rollers supported in tandem relation adjacent the guide to engage the core member and direct it along the guide and hold it against the strip, a belt movably mounted in said longitudinal opening having transverse ribs on its upper surface to engage in the corrugations of the strip, and means for actuating said belt to draw the strip of material through said forming guide, each of said rollers being grooved to receive the core member.

3. Apparatus for forming a transversely corrugated metal strip into a tube about a core member, said apparatus comprising a frame, a forming guide supported on said frame, said guide being flattened toward one end and having walls gradually curving inwardly to be rounded at the other end, said guide having a longitudinal opening extending between the walls thereof, a plurality of guide rollers supported in tandem relation adjacent the guide to engage the core member and direct it along the guide and hold it against the strip, a belt movably mounted in said longitudinal opening having transverse ribs on its upper surface to engage in the corrugations of the strip, and means for actuating said belt to draw the strip of material through said forming guide, each of said rollers being grooved to receive the core member and projecting into the forming guide whereby the strip of material is bent longitudinally between the forming guide and outer surfaces of the rollers.

4. Apparatus for forming a tube from a corrugated but otherwise flat strip, comprising a frame, a forming guide member thereon, said guide member being flattened on one end and having walls gradually curved upwardly and inwardly to be rounded at the other end and having a longitudinal opening at its lower portion, an endless belt mounted for movement along said opening within the guide member to engage a strip of material and carry it through the guide member, said belt having transverse ribs thereon, spring-pressed means for urging the strip against said belt, and means for driving said belt.

5. Apparatus for forming a tube from a corrugated but otherwise flat strip, comprising a frame, a forming guide member thereon, said guide member being flattened on one end having walls gradually curved upwardly and inwardly to be substantially tubular at the other end and having a longitudinal opening at its lower portion, an endless belt mounted for movement along said opening within the guide member to engage a strip of material and carry it through the guide member, said belt having transverse ribs thereon, means extending within said guide member for urging the strip against said belt, means for driving said belt, a die on the frame at the delivery end of the guide member through which the formed tube is led from the guide member, and take-up means to draw the formed tube through the die.

6. An apparatus for forming a tubular sheath from a flat, transversely corrugated, strip of material about a core element, said apparatus comprising a frame, a guide member on said frame having side and bottom walls and having a longitudinal opening in its bottom wall, said guide member being flattened toward one end and having its side walls curved upwardly and inwardly to be substantially tubular at its other end, an endless belt operatively mounted for movement along said opening above the bottom wall of the guide member, said belt having transverse ribs thereon to engage in the corrugations of the strip of material in the guide member from which strip the sheath is to be formed and propel it through the guide member, means for drawing a core element through the guide member above said strip whereby said core element and strip are passed through the guide member and the strip formed into a sheath about the core element, and means above said core member to engage the same and hold it upon the strip and the latter upon said belt, said means comprising a plurality of rollers spaced longitudinally along said guide member, each of which engages said core member.

7. An apparatus for forming a corrugated metal strip into a tube about a core member, said apparatus comprising a longitudinally extending forming guide member through which a cable core and a metal strip are passed for bending the latter into a sheath around the core, said forming guide member having walls flattened at one end and gradually curved upwardly and inwardly to be rounded at the other end and having a longitudinal opening between said walls, an endless belt having transverse ribs thereon, said endless belt having a portion thereof extending into said longitudinal opening to engage the corrugations of the strip within the guide member and propel it through the latter, means supporting said belt, means for driving said belt, take-up means for reeling up the sheathed core, and a tubular mandrel disposed in the forming guide member through which the cable core is passed and about which mandrel the metal strip is bent into tubular form.

8. An apparatus for forming a transversely corrugated metal strip into a tube about a cable core member, said apparatus comprising an outer longitudinally extending forming guide member through which the cable core and the metal strip are passed for bending the latter into a sheath around the core, said forming guide member having a wall flattened at one end and gradually curved inwardly to be rounded at the other end and having a longitudinal opening in said wall, an endless belt movably mounted in said opening having transverse ribs on its upper surface to engage in the corrugations of the strip and propel it through the guide member, means to support and drive said belt, means for urging said core member and said strip toward the belt, and take-up means for reeling up the sheathed core.

9. An apparatus as in claim 8 wherein the wall of the forming guide member comprises two substantially identical half portions having adjacent longitudinal edges, the adjacent longitudinal edges of said half portions being spaced apart to provide the longitudinal opening.

References Cited in the file of this patent
UNITED STATES PATENTS

| | | |
|---|---|---|
| 1,720,508 | Bundy | July 9, 1929 |
| 1,980,308 | Adams | Nov. 13, 1934 |
| 2,029,044 | Westlenning | Jan. 28, 1936 |
| 2,156,952 | Morsing | May 2, 1939 |
| 2,373,531 | Bertalan | Apr. 10, 1945 |
| 2,423,554 | Davidson | July 8, 1947 |
| 2,499,853 | Eckel | Mar. 7, 1950 |
| 2,764,214 | Reynolds et al. | Sept. 25, 1956 |

FOREIGN PATENTS

| | | |
|---|---|---|
| 158,657 | Australia | Sept. 6, 1954 |
| 1,124,043 | France | Oct. 2, 1956 |